United States Patent [19]
Youssef

[11] Patent Number: 6,023,105
[45] Date of Patent: Feb. 8, 2000

[54] HYBRID WIND-HYDRO POWER PLANT

[76] Inventor: Wasfi Youssef, 4 Carol La., Mamaroneck, N.Y. 10543

[21] Appl. No.: 08/828,728

[22] Filed: Mar. 24, 1997

[51] Int. Cl.$^7$ .................................................. H03B 13/00
[52] U.S. Cl. ............................................. 290/54; 290/44
[58] Field of Search ................................. 290/43, 44, 54, 290/55; 60/398; 417/334

[56] References Cited

U.S. PATENT DOCUMENTS

| | | | |
|---|---|---|---|
| 504,301 | 8/1893 | Davis et al. | |
| 1,835,018 | 12/1931 | Darrieus | 415/212 |
| 2,962,599 | 11/1960 | Pirkey | 290/4 |
| 3,803,422 | 4/1974 | Krickler | 290/52 |
| 3,918,839 | 11/1975 | Blackwell et al. | 416/175 |
| 4,010,614 | 3/1977 | Arthur | 60/641 |
| 4,111,610 | 9/1978 | Brown | 417/332 |
| 4,166,222 | 8/1979 | Hanley | 290/55 |
| 4,443,707 | 4/1984 | Scieri et al. | 290/4 R |
| 4,599,854 | 7/1986 | Mayo, Jr. | 60/398 |
| 5,183,386 | 2/1993 | Feldman et al. | 416/119 |
| 5,430,332 | 7/1995 | Dunn, Jr. | 290/54 |

OTHER PUBLICATIONS

NASA, "Wind Energy Develeopment in the 20th Century", U.S. Government Printing Office:757–072/425, 1981.

Doe/NASA/20320–58 and NASA TM–83546, "Large, Horizontal–Axis Wind Turbines", The National Technical Information Services, Springfield, Virginia 22161, 1984.

U.S. Army Corps of Engineers, Hydropower, The Role of the U.S. Army Corps of Engineers, EP 1165–2–317, Nov. 1987.

McGraw–Hill Book Company, "Energy Technology Handbook", Douglas M. Considine Edito–in–Chief, 1977.

California Energy Commission, "Results From The Wind Project Performance Reporting System, 1–st Qtr 1989".

*Primary Examiner*—Nicholas Ponomarenko

[57] ABSTRACT

Explained herein is a method and equipment whereby windmills are used to directly propel water pumps to lift water from a lower elevation body of water to a nearby higher elevation body of water, where it is stored as potential energy.

In one application of this method, one or more water pumps, each powered directly by a windmill, lift water from downstream of a river, stream, or creek to upstream of a dam at which a hydropower plant is installed. The windmill may be of the vertical-axis or horizontal. Upon demand, the lifted water is used to generate electricity utilizing the hydropower plant. An adjustable weir is constructed across the river, stream, or creek downstream the windmill, whose function is to create a reservoir or pool from which water can be pumped and to regulate the flow of water downstream. The adjustable weir can be raised or lowered by means of a jack or jacks that are controlled by a computer. In another application of this invention, one or more water pumps, each powered directly by a windmill is installed at sites having 2 nearby bodies of water, one higher than the other. The bodies of water may be natural or artificial. The water pump lifts water from the low water to the high water, where it is stored as potential energy. Upon demand, the lifted water can be used to generate electricity utilizing a conventional hydropower plant.

6 Claims, 3 Drawing Sheets

HYBRID WIND-HYDRO POWER PLANT

BACKGROUND FOR THE INVENTION

Wind energy has been used in different parts of the world for centuries to pump underground water and mill grain. Simple vertical-axis wind machines were in existence in Pursia several hundred years before the time of Christ. In the 12th century, the horizontal-axis windmills made their appearance almost simultaneously in France, England, and the Netherland.

Dutch settlers brought the windmill to the United States in the middle of the 18th century. Many windmills were built and used to pump water and grind grain.

The first machine to generate electricity from wind was designed and built in Denmark in 1890. Subsequently, several hundred machines were built in that country.

In the United States, wind machines were widely used to generate electricity in rural areas until the 1930's when the Rural Electrification Act provided farmers with cheap electricity.

In 1931, generating electricity from wind took a big step forward when a relatively large windmill of 100-kilowatt capacity was built in Russia.

In the United States, an American engineer and inventor, Palmer C. Putnam started the design of a 1,250-kilowatt wind machine in 1934. The machine was built in 1941 on a hill called Grandpa's Knob in the state of Vermont. After testing, the windmill was connected to the Central Vermont Public Service Corporation. Shortly after operation, a main bearing and a blade failed. Because of World War II, the project was not considered a priority for replacement parts. The machine was not repaired and it was subsequently dismantled.

Following World War II, several countries including England, Denmark, France, and Germany tested several windmills in the 100- to 300-kilowatt range. High construction costs and wind unreliability caused these countries to abandon these windmills and dismantle them.

Following the Arab oil embargo of 1973, which caused huge increase in oil prices, the world's attention was focused once more on wind as an alternative source of energy. The advantages of wind energy are that it is renewable, nonpolluting, and free. It is estimated that wind can provide the United States with all its energy needs. The disadvantages of wind energy are that it is diluted, unpredictable, and requires high initial costs. When wind is not blowing, the entire system sits idly by.

In the United States, the Energy Research and Development Administration (ERDA) planned a multi-year wind energy program that was managed by NASA-Lewis Research Center in Cleveland, Ohio. The overall goal of this program was to expedite the development of reliable and cost-competitive wind energy systems that can be used commercially on a significant scale.

The first of the ERDA/NASA program was a 100-kilowatt wind turbine that was installed at NASA's Plum Brook station near Sandusky, Ohio. It became operational in September 1975. Next, four 200-kilowatt wind machines were designed. They were installed at Clayton, N.Mex.; the Island of Culebra, Puerto Rico; Block Island, R.I.; and Kahuka, Hi. These machines started operation in 1979 and 1980.

The next generation of windmills to be tested by NASA were of the megawatt capacity. A 2,000-kilowatt windmill was installed at Boone, N.C. It started operation in 1979. This was followed by 2,500-kilowatt series of windmills. Three machines were built at Goodnoe Hills in Washington State. They started operation in 1981. In 1982, the Bureau of Reclamation, a part of the United States Department of Interior began testing a 4,000-kilowatt wind machine that was installed near Medicine Bow, Wyo.

All the windmills of the ERDA/NASA's program are of the horizontal-axis type. In addition to the tower and blades, these machines include: (1) A hub which connects the blades to the low-speed shaft. The hub transmits the torque developed by the rotor blades to the shaft and transmits all other blade loads into the bedplate. (2) A pitch-change assembly which consists of a hydraulic supply, a rack and pinion actuator, and gears to rotate the blades in the hub. (3) A drive-train assembly whose purpose is to transmit the mechanical power of the spinning motor to the gearbox. (4) A gearbox that converts the shaft's high-torque low-speed motion into low-torque high-speed motion then fit's the electric generator's requirement. The shaft rotates at 40 rpm while the generator requires 1,800 rpm. (5) A yaw assembly whose function is to support the entire machine assembly on top of the tower and to permit its rotation for alignment with the wind. (6) A generator, whose function is to convert the shaft torque into electricity. This clearly illustrates that converting wind energy directly into electricity is elaborate and requires high initial costs.

The ERDA/NASA's program described above provided valuable information concerning the feasibility of generating electricity from wind. All the windmills in this program were of the horizontal-axis type. However, due to operational problems, all these machines were abandoned and dismantled.

The most successful wind energy program is in the State of California. There are 3 major wind farms at the Altamont Pass, San Gorgonio Pass, and Tehachapi Pass. Their cumulative capacity in 1989 were 634,920 kilowatts, 215,278 kilowatts, and 399,270 kilowatts, respectively. More than 90 percent of the machines are of the horizontal-axis type. The rest are of the vertical-axis type. The windmills of these farms are connected to utility grids.

The windmills currently in use have 2 disadvantages: (1) Each is coupled to its own electric generating equipment. Electric equipment are very expensive and this leads to high initial cost. When wind is not blowing, the entire system sits idly by and (2) The electricity produced by the windmills must be consumed instantly. Typically, wind blows harder by night, when demand on electricity is lowest. This creates operational problem for the utility to whose grid the windmills are connected.

In 1979, Hanley patented an invention (U.S. Pat. No. 4,166,222) in which wind energy is used to produce electricity that is used to lift water from downstream to upstream of a dam with a hydropower plant. The lifted water is stored as potential energy. Upon demand, the water is used to generate electricity.

Hanley's invention addresses the problem of storing wind energy as water potential energy. However, it has the disadvantage of converting wind energy to hydraulic power "which communicate with a power converter 9". Therefore, Hanley's invention, assuming its technical feasibility, involves elaborate equipment and requires high initial costs.

FIELD OF THE INVENTION

This invention describes a method and apparatus for economically converting wind energy into water potential energy by utilizing windmills coupled directly with water pumps to lift water from downstream to upstream of hydropower plant. Upon demand the stored water is used to generate electricity by the hydropower plant. This way, water can be used more than once to generate electricity. It is like recycling water.

A major problem of existing hydropower plants is lack of water. In general, hydropower plants operate at only 35% capacity due to lack of water. In some years, the rainfall may be so scarce that the plant sits idly by most of the time. This is because the water used to generate electricity is discharged from the turbine where it flows away.

Coupling windmills directly to water pumps is advantageous to using windmills to generate electricity in that water pumps are much cheaper than the equipment used to convert wind energy into electricity.

SUMMARY & OBJECT OF THE INVENTION

The present invention reduces the costs of converting wind energy into electricity by directly coupling windmills with water pumps that lift water from lower elevation to higher elevation where it is stored as potential energy.

A primary application of this invention is at hydropower plants and dams. Wind-driven pumps lift water from downstream, or tailwater, to upstream, or headwater. An adjustable weir constructed downstream the water pump holds the water discharged from the turbine and creates a pool or lake from which water can be pumped. The weir can be lowered or raised using a computer. This way, the water flow can be managed to suit the wind and the hydropower plant operation.

Another application of this invention is at sites where wind is strong and where there are two nearby bodies of water, one high and one low. The bodies of water may be natural such as lakes, ponds, sea, oceans, river, creek, or artificial such as ponds or lakes. The wind-driven water pumps lift water from low elevation to high elevation, where it is stored until used by the hydropower plant to generate electricity. In this application, a hydropower plant is needed, but a dam and adjustable weir are not needed.

Any type of windmill can be utilized, although the vertical-axis type is preferred to the horizontal-axis type. This is because the former requires less connecting components and its tower is much smaller than that of the horizontal-axis type. On the other hand, the horizontal-axis type can be built in larger units and can be more efficient.

The object of the invention is to harness wind energy in an economical way and to improve the productivity and cost effectiveness of hydropower plants.

Utilizing wind energy to directly rotate water pumps instead of generating electricity is advantageous in several respects: (1) Water pumps are far less expensive than the equipment that generate electricity. (2) Wind blows at a variable speed, sometimes gusting. while the electric generators powered by the windmills must rotate at a constant speed because the alternate electric current generated must have a constant frequency, otherwise, electric appliances getting power from the windmills will burn. This requires that the blades of the windmill be automatically adjusted in order to rotate at constant speed regardless of wind speed. In this regard, water pumps are less sensitive to wind speed variations than electric generators.

DETAILED DESCRIPTION OF THE INVENTION

This invention is about harnessing wind energy to lift water from low elevation to high elevation where it stored until used to generate electricity by a hydropower plant.

Figure 1:
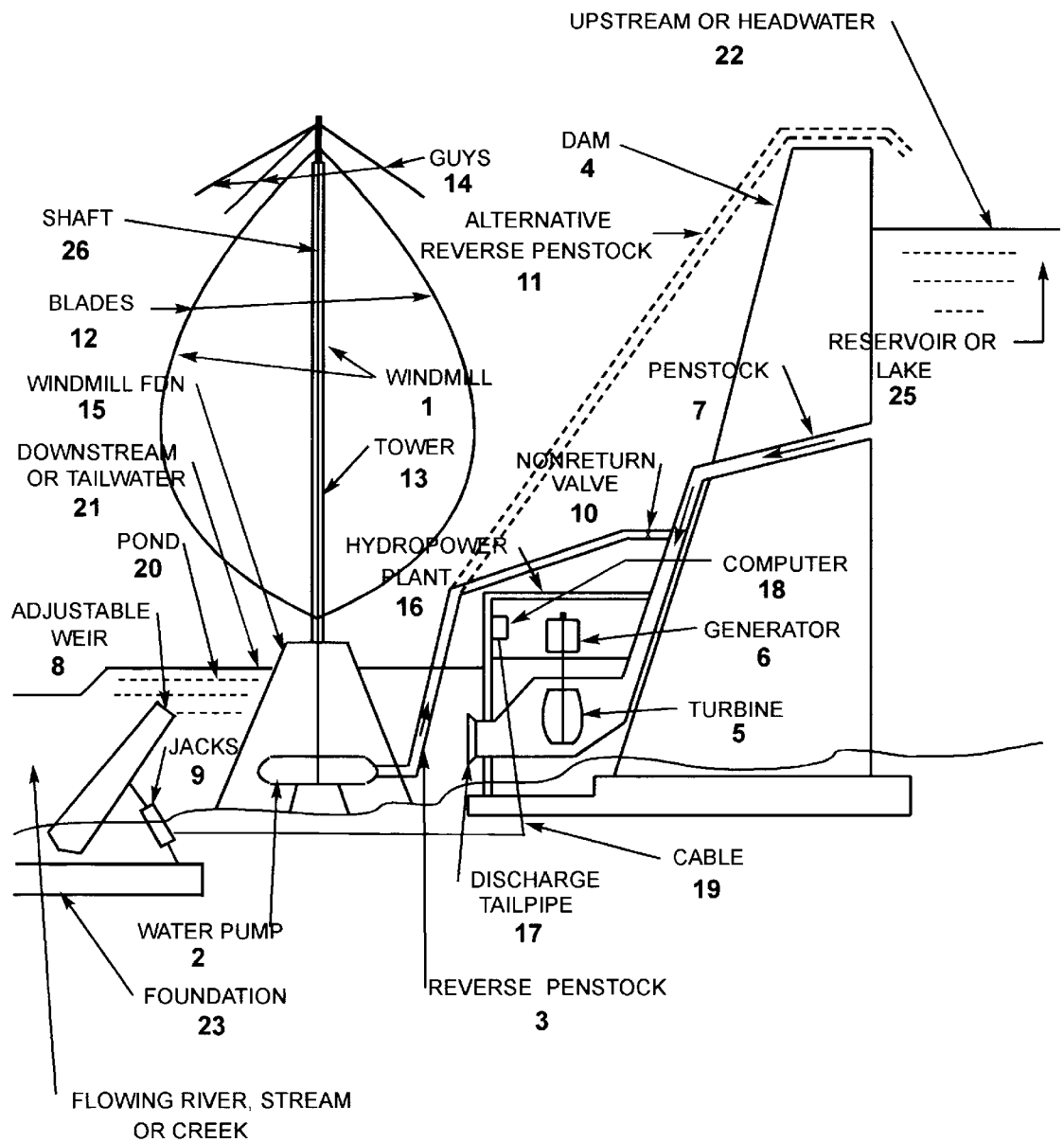
FIG. 1 shows an elevation of the invention consisting of a vertical-axis windmill directly connected to a water pump that pumps water from downstream to upstream a dam and a hydropower plant where the water is stored as potential energy. An adjustable weir controlled by a computer is used to create a pond or lake from which water can be pumped. Upon demand of electricity, the stored water is delivered via the penstock to the turbine connected to an electric generator causing both to turn and generate electricity.

FIG. 1 shows the equipment utilized in one application of this invention at sites having a dam and where downstream is a river, stream, or creek. The equipment consist of a vertical-axis windmill (1) coupled directly with a water pump (2) that lifts water from downstream, or tailwater (21) to upstream or headwater (22), via the reverse penstock (3), where it is stored as potential energy. An adjustable weir (8) is installed on a foundation (23) downstream the pump to create a pond or lake from which water can be pumped. The weir can be raised or lowered by means of one or more jacks (9) that are controlled by a computer (18) that is connected to the jacks by means of a cable (19).

The windmill has 2 or more blades (12) and a tower (13). The tower of the windmill houses the shaft (26) around which the blades rotate. The tower is secured in place by means of 3 or more guys (14). The windmill is installed on a foundation (15). The windmill and the pump are installed downstream the dam (4) and hydropower plant (16).

The site has a conventional dam (4) and hydropower plant (16). The dam creates a high elevation reservoir or lake (25) in which water is stored and from which water can be drawn to generate electricity. The difference between the elevation of the water upstream (22) and downstream (21) creates the pressures that can be converted into electricity. The hydropower plant (16) includes one or more turbines (5), each coupled to an electric generator (6). After turning the turbine and generator, the water is discharged through the discharge tail pipe (17) under atmospheric pressure.

When there is demand for electricity, the hydropower plant operates whether there is wind or not. Water under pressure flows from upstream via the penstock (7) causing the turbine (5) and electric generator (6) to spin. The low-pressure water exits the turbine via the discharge tail pipe (17).

When wind is calm for an extended period, the adjustable weir (8) is lowered by the computer (18) which is connected to the weir by a cable (19). Water is discharged into the river, stream, or creek (24), where it flows away.

When wind is forecast, the adjustable weir (8) is raised by the computer to retain the water discharged from the turbine and thus create a pool or pond (20).

When wind blows, the windmill blades (12) turn the shaft (26) housed inside the tower that is which turns the water pump (2). When the pump rotates, it sucks water from the pond (20) created by the raised adjustable weir and delivers it under pressure into the reverse penstock (3) then to the penstock via a non-return valve (10), that is installed on the reverse penstock (3) before its connection to the penstock (7).

It is preferable to connect the reverse penstock to the penstock in order to save construction costs and reduce the friction losses in the reverse penstock and the penstock. The advantages of this design are explained in the following:

When both the windmill and the hydropower plant are operating, the pumped water flows through the reverse penstock to the penstock then to the hydraulic turbine in the shortest route possible. When the pumped water exceeds the turbine's demand, the excess water flows upstream through the penstock. This excess water has power velocity and thus less friction losses in the penstock than if the turbine demand is totally met by water from the penstock.

When both the windmill and the hydropower plant are operating and the demand of the turbine is greater than the water pumped by the windmill, the deficit is drawn from the water upstream via the penstock. The deficit water has lower velocity and thus less friction losses than if the turbine's demand is met totally by water from the penstock.

If connecting the reverse penstock to the penstock as described above is not feasible, an alternative penstock (11) discharges the pumped water directly upstream.

Figure 2:
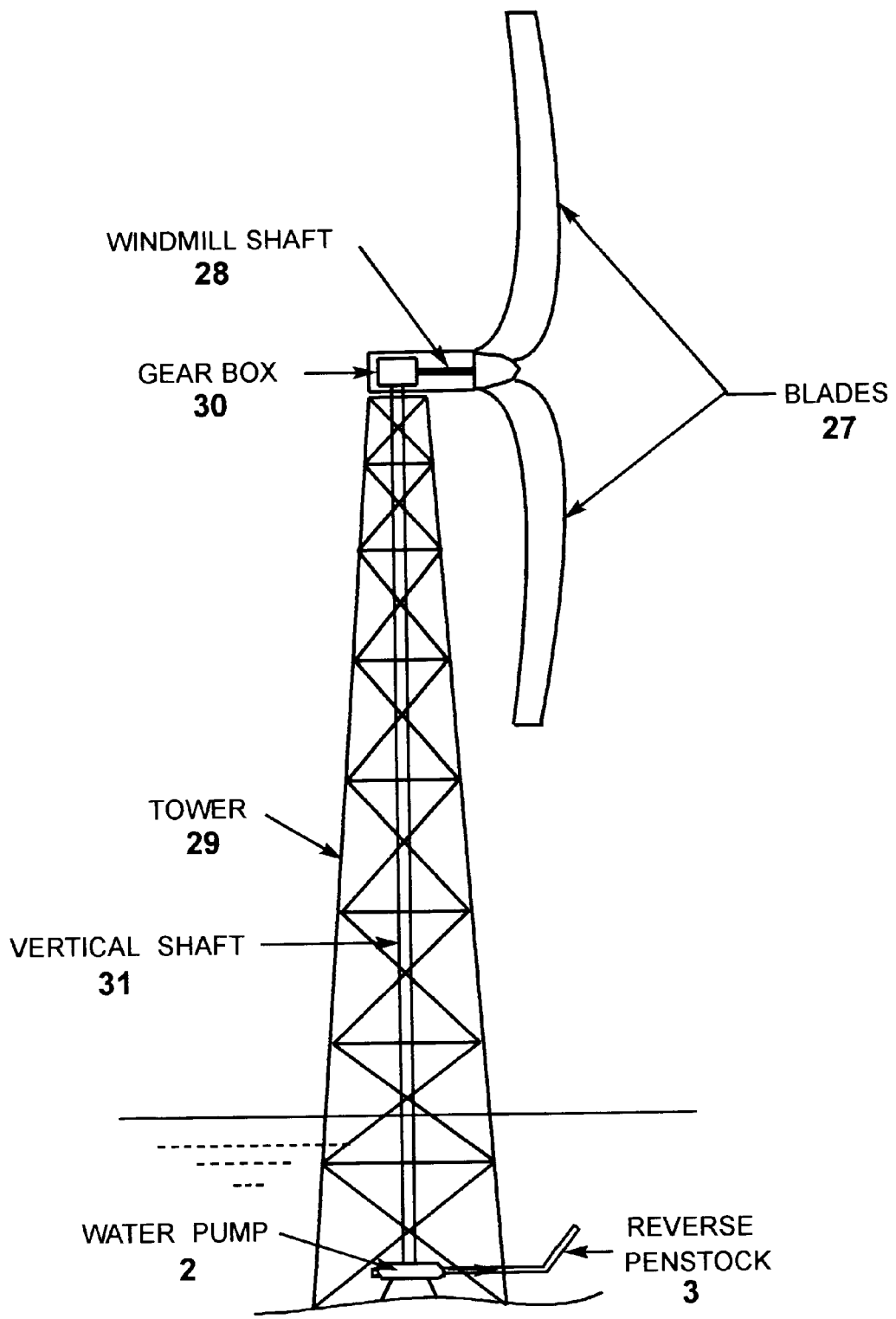
FIG. 2 shows a horizontal-axis windmill as a substitute for a vertical-axis windmill as shown on FIG. 1. The horizontal-axis windmill consists of blades, a tower, a horizontal shaft, a gearbox, and a vertical shaft. The rest of the equipment are identical to those of a vertical-axis windmill shown in FIG. 1.

FIG. 2 shown the elevation shown in FIG. 1 when a horizontal-axis windmill is lieu of instead of a vertical-axis one. As shown in FIG. 2, the horizontal-axis windmill consists of 2 or more blades (27) connected to the windmill shaft (28) and supported by a tower (29). When wind blows, it turns the blades that turn the horizontal windmill shaft (28). The rotation of the windmill shaft (28) is transmitted via a gearbox (30) to a vertical shaft (31) and to the water pump (2). The rest of the equipment operate the same way as described under vertical-axis windmill shown in FIG. 1.

Figure 3:
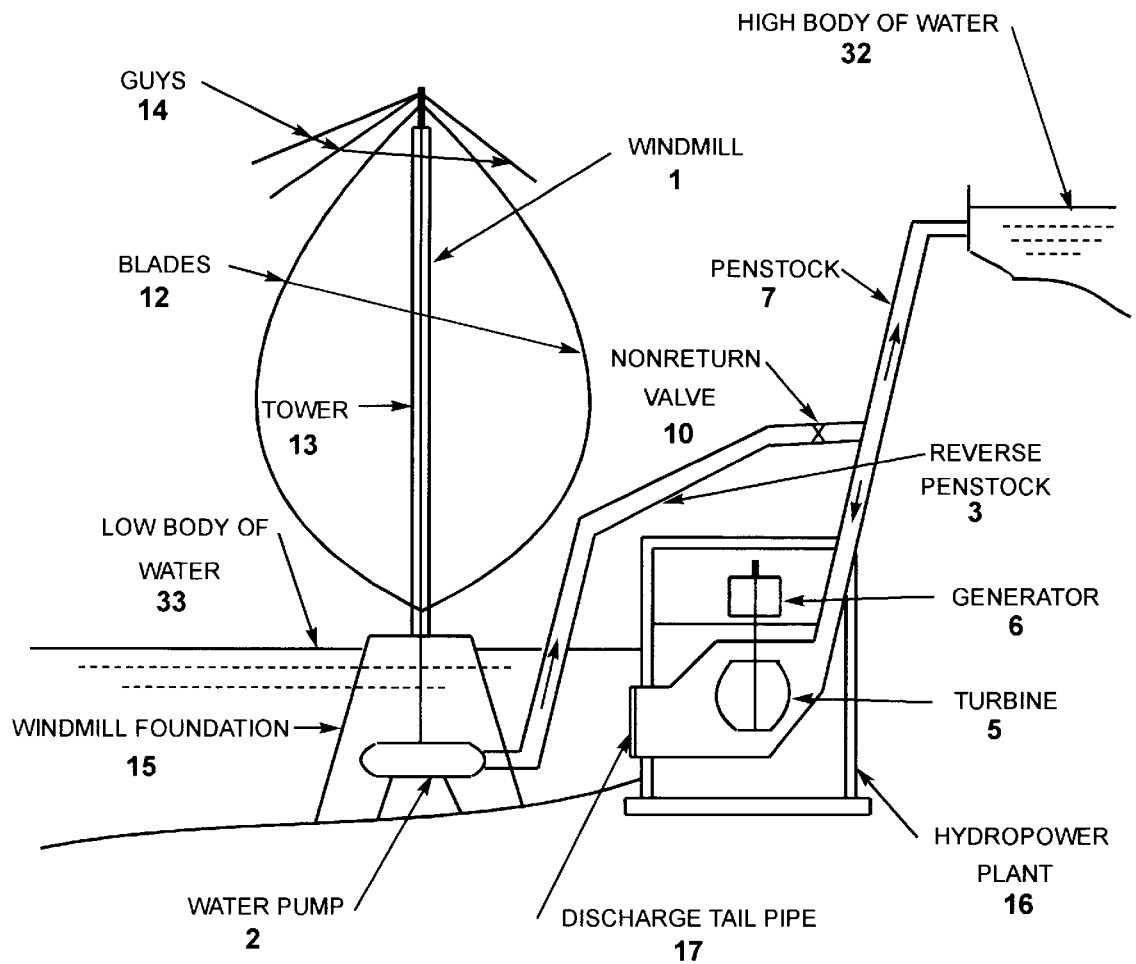
FIG. 3 shows an elevation of the invention when used at sites having 2 nearby bodies of water, one higher than the other. Water is pumped from low elevation to high elevation utilizing a vertical-axis windmill consisting of blades, a tower, and guys. The windmill is directly connected to a water pump. The way water is pumped from low elevation to high elevation and the way stored water is used to generate electricity are similar to those shown in FIG. 1.

FIG. 3 describes the method and equipment employed by this invention at sites where a there are 2 nearby bodies of water, one high (32) and one low (33). One or both bodies of water may be natural such as a river, lake, sea, ocean, pond, or artificial such as a pond or lake.

The method and equipment operate in a way similar to that shown in FIG. 1, except that a dam, adjustable weir, jacks and the computer that control them and the cable that connects the computer to the jacks are not needed. The method and equipment in FIG. 3 operate as follows:

A windmill (1) is coupled directly to a water pump (2) that pumps water from the low elevation (33) through the reverse penstock (3), through the non-return valve (10), through the penstock (7) to the high elevation (32), where it is stored as potential energy.

Upon demand for electricity, stored water is used to generate electricity using a hydropower plant. The water moves from the high elevation (33) through the penstock to the hydropower plant (16) where it causes the turbine (5) and the generator (6) to rotate and generate electricity. After turning the turbine, the water exits the turbine via the discharge tail pipe (17), where it can be lifted by the water pump (2), and the process is repeated.

This invention harnesses wind energy more economically than the current technology of using wing to directly generate electricity. This make it feasible to develop sites having less wind speed or water flow than those that are currently considered economically feasible to develop. It also allows the storage of wind energy in the form of water potential energy until there is demand for electricity. It also makes it possible for hydropower plants to operate more hours and gerate more electricity without adding new equipment.

In the windmill machines currently in use, each windmill is connected to electric generating equipment connected to the windmill's shaft. This results in high construction costs. In horizontal-axis wind machines, which form the majority of the wind machines in operation, the electric generating equipment are installed on top of the tower, which subjects them to high vibrations during wind gusts. This shortens the equipment's life span. Furthermore, the electricity generated by the wind machines must be consumed instantly. Generally, wind blows stronger at night when the demand for electricity is lower. This means that existing wind machines generate most of their electricity at a time when the demand is low. This creates operational problem for the utility to whose grid the wind machines are connected.

I claim:

1. A hybrid wind-hydro power plant in which a difference between two water levels is utilized to generate an electrical power, comprising:

a first water reservoir located at a high level;

a second water reservoir located at a low level;

an equipment for pumping water from said second low reservoir to said first high reservoir consisting of: (a) a water pump positioned in said second reservoir for pumping water to said first reservoir, (b) a penstock from said pump to said first reservoir, which has a non-return valve to allow water flow upstream but not downstream, and (c) a windmill with a rotational shaft coupled directly to said water pump to rotate said water pump and act as a prime mover for said water pump;

a hydraulic turbine installed to receive water via penstock from said first reservoir and to discharge said water to said second reservoir and to convert said water's kinetic energy into mechanical energy of turbine rotation;

an electrical generator coupled to said turbine and rotated by said turbine to produce electrical energy.

2. A hybrid wind-hydro power plant as in claim 1 where said windmill is a vertical-axis type windmill.

3. A hybrid wind-hydro power plant as in claim 1 where said windmill is a horizontal-axis type windmill located on a tower with a torque transmitted via shaft connected from said windmill to said water pump through a gear-box.

4. A hybrid wind-hydro power plant as in claim 1 where said first and said second reservoirs are created by a dam in a river.

5. A hybrid wind-hydro power plant as in claim 4 where said lower reservoir has an adjustable weir for controlling a discharged water level from said turbine.

6. A hybrid wind-hydro power plant as in claim 5 where said weir control is performed by a computer.

* * * * *